SOUND RECORDING AND REPRODUCING DEVICES

Filed June 19, 1957 3 Sheets-Sheet 1

Aug. 25, 1959 E. BRASSEUR 2,901,550

SOUND RECORDING AND REPRODUCING DEVICES

Filed June 19, 1957 3 Sheets-Sheet 2

2,901,550

SOUND RECORDING AND REPRODUCING DEVICES

Eudore Brasseur, Mont-sur-Marchienne, Belgium, assignor to Societe Anonyme Ateliers de Constructions Electriques de Charleroi, Brussels, Belgium, a corporation of Belgium Application June 19, 1957, Serial No. 666,643

Claims priority, application France June 25, 1956

2 Claims. (Cl. 179—100.2)

The present invention relates to improvements in sound recording and reproducing devices in which an elongated sound track receiving record is intermittently advanced with a step-by-step movement and the recording and reproducing head moves in alternately reverse directions generally across the record during the periods of rest of the record. The present invention particularly relates to improvements in the mechanism for advancing or moving the record and accurately positioning it.

The mechanism for advancing and accurately positioning the record according to the present invention is particularly applicable to sound recording and reproducing devices of the electro-magnetic type in which the record or sound track receiving means incorporates at least a layer of magnetizable material responsive to the head so as to form a sound track on the record when the device is recording and to play back the sound from the sound track when the device is reproducing. Such a sound track is of a zigzag shape, with parallel main runs of the sound track extending generally transverse to the length of the record and spaced from each other, such main runs being connected at their ends by short portions extending parallel to the length of the record, the main transverse portions of the sound track being formed by the head during the periods of rest of the record, and the other shorter portions being formed during movement of the record.

In sound recording and reproducing devices of this type it is necessary to accurately position and move the record in short increments in order to assure proper recording and particularly fidelity of reproduction. Heretofore, mechanisms or devices for moving and accurately positioning the sound track receiving means, as for example an elongated record, have been constructed by using rotative inter-engaging members which results in a high noise ratio affecting the quality of the recording. Further, the members are subject to wear which results in "play" in the members increasing the noise generated by the mechanism and affects the accuracy of the positioning of the record so that fidelity of reproduction is adversely affected.

Moreover, the use of inter-engaging members requires that they be machined or otherwise dimensionally controlled with great accuracy thus greatly complicating the manufacturing of such devices and increasing production costs. It can readily be seen that such devices require that the inter-engaging rotative parts be made of wear-resistant materials or otherwise provided with wear-resistant surfaces to reduce the aforementioned wear and tear and its attendant loss of accuracy of recording and fidelity of reproduction.

It is a principal object of the present invention to provide a simple inexpensive, easily constructed record moving and positioning device for a recording and reproducing device of the type described capable of overcoming the above mentioned limitations and deficiencies of the present devices.

Another object is to provide record motive means capable of operating silently and without need of meshing components, as for example gears, subject to wear and thus having greater wear-life.

Still another object is to provide a device capable of advancing, accurately positioning and reversing the movement of a record and forming a very compact unit.

A feature of the device in accordance with the present invention is that it comprises motive means, positioning means and reversing means, each of which is electro-magnetically actuated with the motive means and reversing means being substantially similarly constructed. Each of the three means comprises at least one magnetic member comprising a plurality of teeth disposed on an arcuate end of the member forming a plurality of flux paths when flux is generated in the member. Cooperating with each magnetic member is a magnetic disc or wheel having peripheral teeth having the same pitch as the teeth of the magnetic member. The toothed wheels are disposed radially to the teeth of the magnetic members so that the teeth are radially spaced and the teeth tips lie in substantially concentric spaced circles. The teeth of the magnetic members and toothed wheels or discs of the motive means and reversing means are misaligned when the record is at rest permitting the flux, when generated in timed relationship with the movements of the sound head, in the magnetic members to attract the teeth of the associated disc into alignment thus rotating the disc which through a driving shaft moves the record in one of two directions. The positioning means on the other hand has a magnetic member having teeth and similarly constructed as the aforementioned magnetic members. It too comprises a magnetic disc having peripheral teeth but in this instance the teeth of the disc and the magnetic member are aligned when the record is at rest and thus form paths of least reluctance to flux in the magnetic member so that there is a constant tendency toward alignment. The disc of the positioning means is thus an aligning disc and since it is fixed to the driving shaft it controls the step-by-step advancing or reverse movement of the record as a function of successive alignments of the disc teeth with the teeth of the magnetic member so that the movement is substantially a function of the pitch of the positioning means toothed members.

Other features and advantages of the device in accordance with the present invention will be better understood as described in the following specification and appended claims, in conjunction with the following drawings in which Fig. 1 is a plan view of a schematic diagram of a device in accordance with the present invention.

Figure 1:
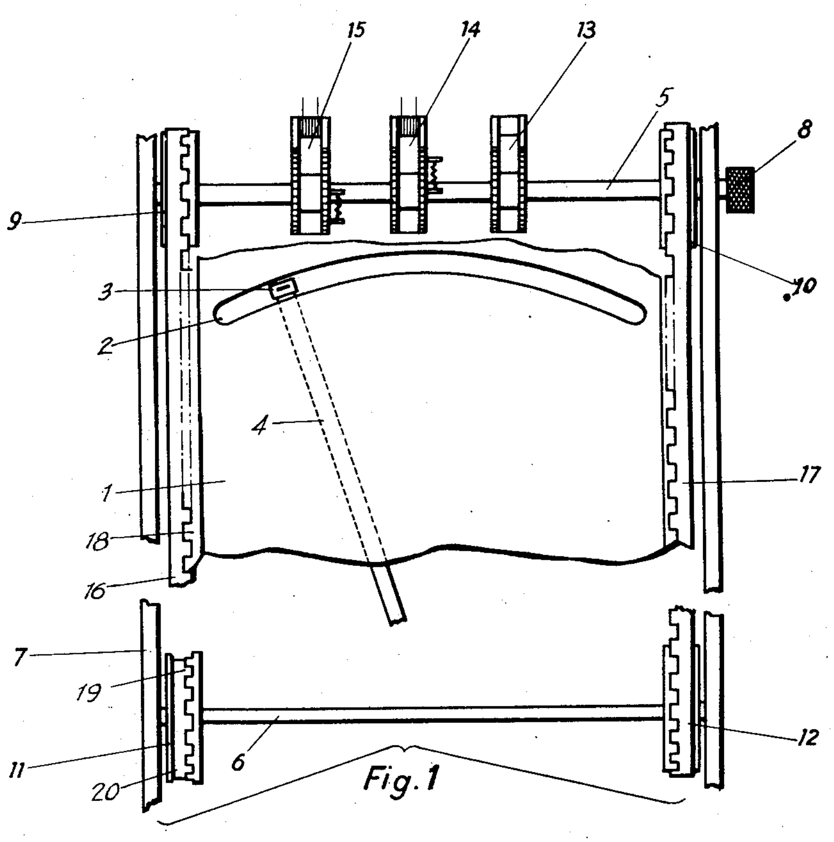

The sound recording and reproducing device shown in the drawings comprises a plate 1 on which rests a sound track receiving means, as for example, an elongated record, not shown. The plate 1 is provided with a slot 2 in which a recording and reproducing head 3 is moved by a tone arm 4 in alternately reverse directions generally across the record during the periods of rest of the record. The record is moved in two opposite directions in a manner to be later herein disclosed by a driving shaft 5 and an idling shaft 6 both rotatably mounted on frame 7. The driving shaft 5 is provided with a knurled knob 8 for manual rotative adjustment and with driving wheels 9 and 10. The shaft 6 is provided with wheels 11 and 12 fixed thereon to rotate with it. The driving shaft 5 is accurately positioned in successive angular positions corresponding to equal angular displacements by magnetically-actuated positioning means 13 when rotated in successive movements in a record-advancing direction by magnetically-actuated motive means 14 or in a reverse direction by reversing means 15. The device is provided with two endless driving belts 16 and 17 each having notches 18, as shown, which are engaged by corresponding projections on the sound track receiving record. The wheels 9 to 12 are provided with an outboard flange and an inboard flange having notches 19 which correspond in dimension to those of the record. It will be understood that the belts 16 and 17 have sufficient thickness to ride in the peripheral groove 20 formed by the wheel flanges and are engaged by the wheel notches 19 to be driven thereby without slippage and without danger of slipping off the wheels and at the same time the upper portion of each of the belts 16 and 17 is disposed tangential to the record and engages the record driving it in a positive manner without slippage.

Figure 2:
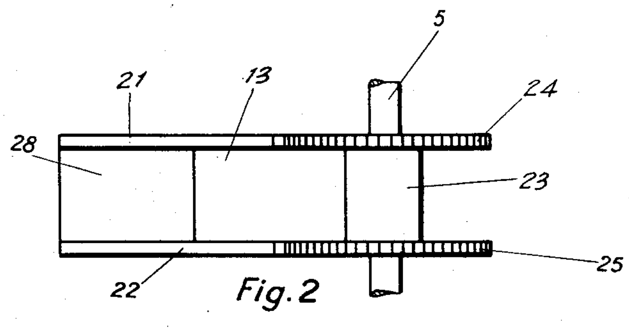
Fig. 2 is a plan view of the positioning means of the device according to the present invention.

The positioning device or means 13 comprises (Fig. 2) two magnetic members or plates 21 and 22 disposed substantially parallel. A sleeve or coupling 23 integral with or otherwise fixed to driving shaft 5 is connected to toothed wheels or aligning discs 24 and 25 having equally spaced peripheral teeth 26. The members 21 and 22 each have an arcuate end (Fig. 3) provided with teeth 27 having the same pitch as the disc teeth 26. The plates and discs are disposed in spaced relationship and so constructed that the tips of their teeth lie in substantially concentric circles so that the space between tips is constantly the same as discs 24 and 25 rotate with shaft 5. When the record is at rest the teeth 26 and 27 are aligned thus providing a path of least reluctance to flux generated in members 21 and 22 by a magnet 28. It being understood that member 28 may be a permanent magnet or an electro-magnet. Thus it can be seen that the lines of force will tend to maintain the radially opposed teeth in alignment and will resist rotation of the discs. Thus it can readily be seen that if rotatably mounted shaft 5 is imparted with rotative movement the shaft will be stopped automatically in successive positions corresponding to the successive positions of alignment of the radially opposed teeth. Accordingly the positioning device 13 operates quietly and without wear and tear on the rotative members thereof. It will be understood that only one magnetic member and one aligning disc need be provided with corresponding teeth or of equal pitch.

The record is advanced or moved in a forward direction by record-advancing or motive means 14 comprising spaced tooth wheels or discs 40 and 41 having peripheral teeth (Figs. 4 and 5) and interconnected by a sleeve 42 rotatably mounted on shaft 5. Two magnetic members or plates 44 and 45 are disposed radially to rotative magnetic discs 40 and 41 each having an arcuate end, as shown, provided with teeth having the same pitch as the magnetic rotative discs. The magnetic members and the magnetic rotative discs are so constructed and arranged that the tips of their teeth lie in substantially concentric circles so that the teeth are spaced radially at a constant distance as the rotative discs rotate relative to the plates. Between members or plates 44 and 45 is provided an electro-magnet 43 energized in timed relationship with the movements of the sound head in a manner to be later herein disclosed. The teeth of the plates and discs are radially disposed with their central axis misaligned or offset a selected distance (Fig. 6) as for example, tooth 53 of plate 45 has an axis *a* and the notch has an axis *a'* with the disc 41 having a tooth 52 identical to tooth 53 and with its axis *b* offset from axis *a* a selected distance in a given direction when the record is in a rest position while being scanned by the sound head. It will be understood that small portions of the teeth 52 and 53 overlap or lie in the same planes. It can readily be seen that the teeth 53 provide a plurality of flux paths through which lines of force will tend to attract the teeth 52 into alignment therewith thus rotating he discs in a direction of the arrow 54 when electro-magnet 43 is energized.

However, since the path of least reluctance exists when the radially disposed teeth of the motive means are directly opposite each other there is a tendency for the discs to merely align their teeth with those of their associated discs. Accordingly to overcome this tendency the disc 41 is provided with a radial slot 48 in which is disposed a projection 49 fixed on the driving shaft 5 and free to move angularly in slot 48. A spring 50 is connected to the projection 49 and to the disc 41 at a point 51 disposed in the direction of rotation of disc 41. The spring 50 and projection 49 function in a manner later herein disclosed.

Figure 7:
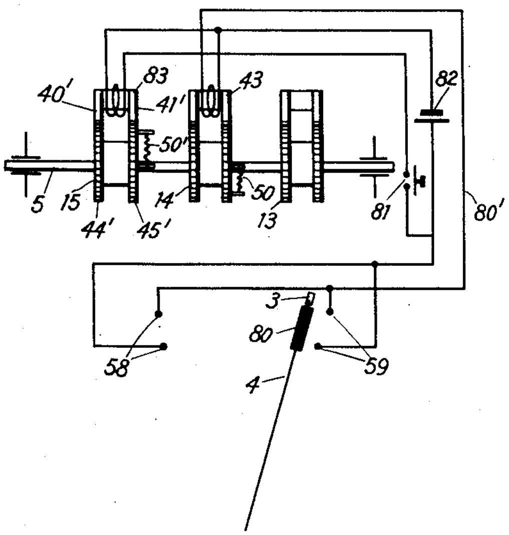
Fig. 7 is schematic wiring diagram of the device according to the invention.

The reversing device or means 15 is constructed similarly to the advancing means or motive means 14 and is likewise provided with plates or magnetic members 40' and 41' and with rotative disc 44'—45' cooperating therewith (Fig. 7). A spring 50' is disposed to cooperate with a projection on shaft 5 and a radial slot in disc 45', not shown. It will be understood that the reversing means is arranged to impart rotation to driving shaft 5 in a direction opposite to the advancing direction imparted thereto by motive means 14. Accordingly it is provided with an electro-magnet 83.

The motive means 14 functions as follows: It will be understood that the record is at rest while the sound head 3 is traversing it in a recording and reproducing zone formed by the slot 2. When the tone arm, driven by means not shown, reaches the end of one of its reverse movements (Fig. 7) it bridges either of a set of normally open contacts 58—59 with a conductor 80 thus closing a circuit 80' connected to a source of current, as for example, a battery 82 energizing electro-magnet 43 which generates flux in the magnetic members 44—45 so that the teeth 53 thereof provide a plurality of flux paths through which lines of force will attract the teeth 52 of the rotative discs 40—41, which are not in alignment with teeth 53, into alignment with the lines of force of teeth 53.

Figures 3, 4, 5, 6:
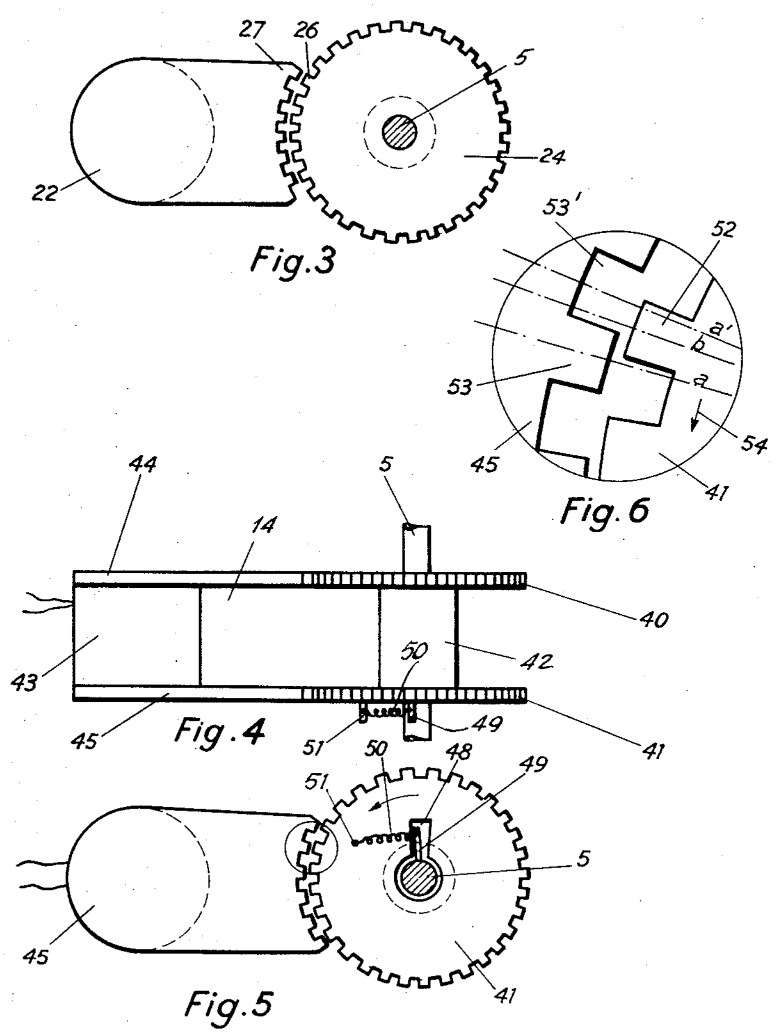
Fig. 3 is a side view of the positioning means shown in Fig. 2.
Fig. 4 is a plan view of the motive or advancing means according to the invention.
Fig. 5 is a side view of the motive means shown in Fig. 4.
Fig. 6 is an enlarged profile view of the encircled teeth of the motive means in Fig. 5 and shows the selected misalignment of the teeth.

Thus disc 41 rotates and places spring 50 under tension since the shaft 5 will resist rotation due to the inertia of the members it drives. Since the tone arm quickly reverses its direction of travel the period of time that electro-magnet 43 is energized is quite short but the flux is sufficient to place the spring 50 under tension. As the teeth are being aligned the spring will draw the shaft 5 along by causing projection 49 to strike the side of the slot 48 as shown in Fig. 5. The contraction of the spring along with the slight impact by projection 49 will displace discs 40—41 past the point of alignment so that the teeth will again be displaced as heretofore disclosed. The final position of the motive means discs is determined by the positioning means whose teeth are aligned when the teeth of the motive means are in proper angular misalignment or properly displaced and accordingly the record is properly positioned for reverse scanning by the sound head and the motive means is properly positioned for the next successive movement without overrunning its proper position due, of course, to the quick reversal of direction of the tone arm and the action of the positioning means.

If the materials comprising the projection 49 and disc 41 are properly selected the motive means functions substantially without noise even though the projection strikes the disc with a slight impact and the sound track receiving record is accordingly moved silently and accurately in timed displacements of equal distance.

The reversing device or means 15 has the electromagnet 83 connected to the current source 82, as shown in Fig. 7. A normally open switch 81 is provided for selectively energizing the electro-magnet 83 for reversing the rotation of the driving shaft thereby to move the record in a backward or reverse direction. It will be understood that the component members of the reversing means 15 cooperate substantially in a similar manner as disclosed with respect to the motive means 14 and the record can be moved backwardly any given distance by merely holding the switch or push button 81 depressed.

Figure 8:
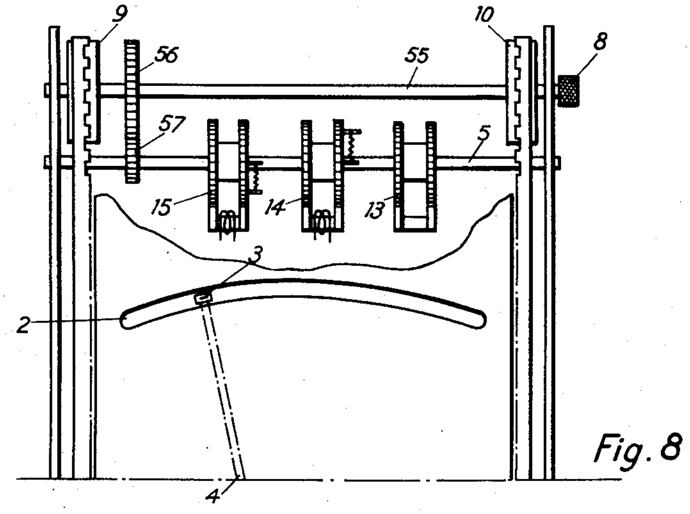
Fig. 8 is a plan view of another embodiment of the device shown in Fig. 1 and shows a multiplier mechanism according to the present invention.

In the description of the elements heretofore given the displacement of the record, its advance or backward movement, is directly controlled by the pitch of the toothed discs particularly the positioning disc and the movement is in direct ratio to this pitch. However, it will be understood that this need not be the case and that the movement of the driving shaft may not necessarily be directly proportional to the pitch of the toothed wheels or discs of means, 13, 14, 15. Accordingly a driven shaft 55 (Fig. 8) may be provided with a gear 56 driven by a pinion 57 fixed on shaft 5. The gear ratio may be any multiple of the angular displacement of shaft 5 thus the shaft 55 may turn less revolutions than the shaft 5 as in the present example. The gear ratio of gears 56 and 57 may be selected as a function of the desired angular displacement of shaft 55 which in this case is provided with the belt-driving wheels 9—10. In this embodiment the knob 8 is mounted on shaft 55 for selective manual angular movement of shaft 55 in a forward or reverse direction so as to selectively position the record manually.

Figure 9:
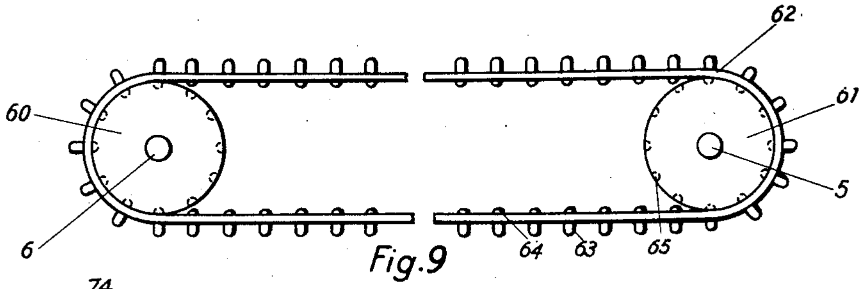
Fig. 9 is a vertical view of another embodiment of the driving belt shown in Fig. 1.

Moreover, the driving belts 16—17 and driving wheels 9—10 need not be constructed in the manner shown in Fig. 1. Thus driving wheels 60—61 (Fig. 9), driven by shaft 5, may be provided with recesses 65 as shown. A driving belt 62 provided with projections substantially normal to the runs of the belt, as shown with a long projecting portion 63 engaging the corresponding notches in the record and a short projecting portion 64 engaging the peripheral recesses 65 so as to move the record in a positive manner without slippage.

Figure 10:
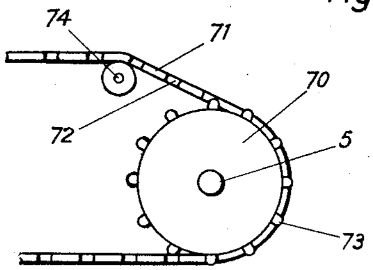
Fig. 10 is a vertical view of a third embodiment of the driving belt shown in Fig. 1.
Figure 11:
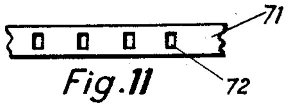
Fig. 11 is a plan view of the driving belt in Fig. 10.
Figure 12:
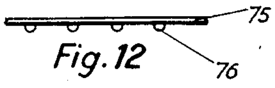
Fig. 12 is a profile view of a record of the type used with the type driving belt shown in Fig. 10.

Another embodiment (Figs. 10–12) comprises driving wheels constructed in the manner of wheel 70 driven by shaft 5 and shaft 6 is provided with similar wheels (not shown). The driving belts are constructed similarly to belt 71 and are provided with apertures 72 releasably engaged by peripheral, angularly spaced, driving-wheel projections 73 for driving it. Guide rollers, as for example, roller 74 guide the upper run of the belt and hold the record-driving portion thereof flat, spaced and clear of the driving wheels since in this instance the record is constructed in the manner of record 75 provided with downwardly projecting extensions 76 releasably engaging the apertures 72 of belt 71.

While preferred embodiments of the invention have been shown and described it will be understood that many modifications and changes can be made within the scope of the invention.

What I claim and desire to secure by Letters Patent is:

1. In a sound recording and reproducing device wherein a sound track receiving means is moved step-by-step past a recording and reproducing zone and a sound head is moved in successive reverse directions generally transverse to the direction of movement of the sound track receiving means, motive means for advancing the sound track receiving means in successive step-by-step movements past the recording-reproducing zone comprising, a rotatable driving shaft, at least one magnetic member having a plurality of teeth disposed on an arcuate end of said member, at least one rotative magnetic disc fixed on said shaft having peripheral teeth spaced from the teeth of said member and disposed radially opposite thereto in position to maintain the tips of each of its teeth equally spaced from the tips of the teeth of the member when rotated relative to said member, the disc teeth disposed opposite to the teeth of the member having their axis normally disposed in a given direction away from the axis of the teeth of said member and portions of the disc teeth opposite the teeth of said member lying in corresponding radial planes with the teeth of said member, means for generating flux in said magnetic member in timed relationship with the movements of said sound head to rotate said disc in a direction toward alignment of its teeth with the teeth of said member, means for imparting motion to said rotative disc in the direction of rotation past a point of alignment of said teeth rotative disc and magnetic member thereby to misalign said teeth a selected angular distance comprising, a radial projection on said shaft, said rotative disc of said motive means having a radial slot with said radial projection on said shaft disposed in said slot so as to freely move therein, spring means fixed to said projection and to said disc at a point ahead of said projection and in the direction of rotation of said disc, and positioning means comprising, a second magnetically-actuated disc for accurately positioning said shaft in successive positions corresponding to equal angular displacements when rotated in successive movements in two opposite directions of rotation thereby to accurately position said sound track receiving means during said step-by-step movements.

2. In a sound recording and reproducing device according to claim 1, including reversing means constructed similarly to said motive means comprising third magnetically-actuated rotative disc for reversing the direction of rotation of said driving shaft and rotating it in successive movements of angular displacement in a direction opposite to the direction which said motive means rotates said driving shaft thereby to move the sound track receiving means in step-by-step movements past the recording and reproducing zone and in said opposite direction.

References Cited in the file of this patent

UNITED STATES PATENTS

| | | |
|---|---|---|
| 849,484 | Menasco | Apr. 9, 1907 |
| 1,765,898 | Altner | June 24, 1930 |
| 2,030,400 | Rosene | Feb. 11, 1936 |
| 2,249,029 | Mullerheim | July 15, 1941 |
| 2,492,435 | Ostline | Dec. 27, 1949 |
| 2,648,589 | Hickman | Aug. 11, 1953 |
| 2,776,569 | Biro | Jan. 8, 1957 |